United States Patent
Fair

(10) Patent No.: US 9,328,631 B2
(45) Date of Patent: May 3, 2016

(54) SELF-GENERATED POWER INTEGRATION FOR GASIFICATION

(75) Inventor: Delome Fair, Houston, TX (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 1893 days.

(21) Appl. No.: 12/389,758

(22) Filed: Feb. 20, 2009

(65) Prior Publication Data

US 2010/0212226 A1    Aug. 26, 2010

(51) Int. Cl.
| | |
|---|---|
| B01J 7/00 | (2006.01) |
| F01K 23/10 | (2006.01) |
| C10J 3/86 | (2006.01) |
| F01K 23/06 | (2006.01) |
| F22B 1/18 | (2006.01) |
| C10K 1/00 | (2006.01) |
| C10K 1/04 | (2006.01) |

(52) U.S. Cl.
CPC . F01K 23/10 (2013.01); C10J 3/86 (2013.01); C10K 1/004 (2013.01); C10K 1/04 (2013.01); F01K 23/068 (2013.01); F22B 1/18 (2013.01); *C10J 2300/1675* (2013.01); *C10J 2300/1678* (2013.01); *C10J 2300/1687* (2013.01); *Y02E 20/16* (2013.01); *Y02E 20/18* (2013.01)

(58) Field of Classification Search
USPC .................. 48/61–118.5, 127.9; 422/129–242
See application file for complete search history.

(56) References Cited

U.S. PATENT DOCUMENTS

| | | | | |
|---|---|---|---|---|
| 3,868,817 | A | * | 3/1975 | Marion et al. ................... 60/781 |
| 4,178,758 | A | * | 12/1979 | Paull et al. ....................... 60/648 |
| 4,663,931 | A | | 5/1987 | Schiffers |
| 4,799,356 | A | | 1/1989 | Doering |
| 4,946,477 | A | | 8/1990 | Perka et al. |
| 5,081,845 | A | | 1/1992 | Allam et al. |
| 7,587,995 | B2 | | 9/2009 | Kraft et al. |
| 2007/0119577 | A1 | | 5/2007 | Kraft |

(Continued)

FOREIGN PATENT DOCUMENTS

| | | |
|---|---|---|
| CN | 10-1351622 A | 1/2009 |
| CN | 101351622 A | 1/2009 |

(Continued)

OTHER PUBLICATIONS

PCT Search Report issued in connection with corresponding WO Patent Application No. US10/22484 filed on Jan. 29, 2010.

(Continued)

*Primary Examiner* — Imran Akram
(74) *Attorney, Agent, or Firm* — Cooper Legal Group, LLC

(57) ABSTRACT

A gasification facility includes an air separator and a high temperature gas cooler for cooling the gaseous products that are produced at the facility's gasifier. The high temperature gas cooler is configured and a method is provided to produce superheated steam that is used to generate electric power in a steam turbine to satisfy the power demands of at least the air separator. Alternatively, or in addition, the superheated steam can be employed to drive compressors at the air separator. The high temperature gas cooler can be further configured so that it produces only that quantity of superheated steam required for the steam turbine to power the gasification facility, including the air separator, or a quantity of superheated steam adequate for the steam turbine to both power the gasification facility, including the air separator, and provide electric power or superheated steam to other users.

12 Claims, 1 Drawing Sheet

(56) References Cited

U.S. PATENT DOCUMENTS

| | | |
|---|---|---|
| 2007/0180768 A1 | 8/2007 | Briesch |
| 2007/0245736 A1 | 10/2007 | Barnicki |
| 2008/0034758 A1 | 2/2008 | Marlin et al. |
| 2008/0041572 A1 | 2/2008 | Wessel et al. |
| 2008/0175770 A1 | 7/2008 | Wallace |

FOREIGN PATENT DOCUMENTS

| | | | |
|---|---|---|---|
| DE | 3327367 | A1 | 2/1985 |
| GB | 2075124 | A | 11/1981 |
| JP | 54076602 | | 6/1979 |
| WO | 03069132 | A1 | 8/2003 |

OTHER PUBLICATIONS

Chinese Office Action dated Apr. 10, 2014, cited in CN101351622.
English language translation of Chinese Office action dated Apr. 10, 2014, cited in CN101351622.
Translation of Japanese Office action for Patent application 2011-551095 dated Apr. 23, 2014.
English language translation of Abstract for CN101351622.
Chinese Office Action dated Mar. 30, 2015.
English language translation of Chinese Office action dated Mar. 30, 2015.

* cited by examiner

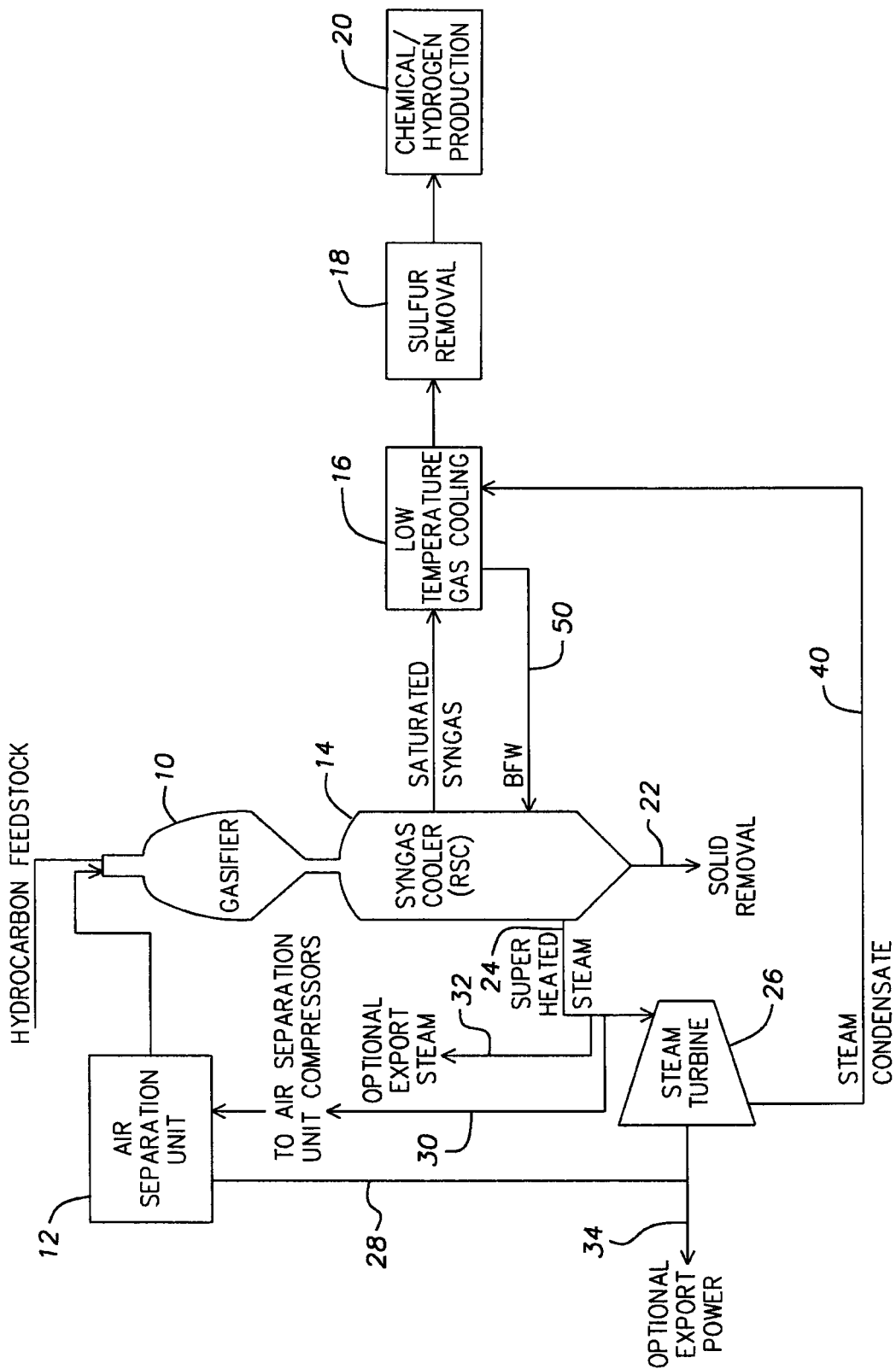

SELF-GENERATED POWER INTEGRATION FOR GASIFICATION

BACKGROUND OF THE INVENTION

The present invention relates generally to gasification facilities and in particular to gasification facilities that include high temperature gas coolers and air separation units.

Gasification plants or facilities of various types are known. The feature that is common to such plants or facilities is a gasifier in the nature of an enclosed pressurized reactor in which a hydrocarbon feedstock or fuel is converted into gaseous products, sometimes referred to as "syngas", by applying to the feedstock or fuel in the gasifier heat under pressure in the presence of steam and controlled amounts of air or oxygen. Typical hydrocarbon feedstocks or fuels that are employed are coal, petroleum and biomass for example.

The introduction of air or oxygen into the gasifier is controlled so that only a relatively small portion of the feedstock or fuel burns completely. This partial burning of the fuel provides at least a portion of the heat the process requires. The remainder of the hydrocarbon feedstock or fuel is chemically broken down under the heat and pressure in the gasifier, resulting in the chemical reactions that produce the gaseous products. The particular gaseous products that are produced vary depending in part on the type of feedstock that is used and the conditions imposed within the gasifier. Examples of gaseous products that are typically produced include carbon monoxide and hydrogen.

It often is preferable in a gasification plant or facility to use oxygen rather than air because using air requires that large amounts of nitrogen be handled and to do so can be costly. Also, the nitrogen can disadvantageously dilute the gaseous products that are produced. As a result, gasification plants will often include an air separator that separates the oxygen in the air from the nitrogen and delivers to the gasifier only the oxygen in such quantities as are needed to operate the gasifier.

The gaseous products that are produced in the gasification process can be variously applied. Typically, however, the gaseous products are first cooled and cleaned of particulate matter and sulfur compounds. The cooling process can involve the use of both a high temperature cooler, such as a radiant synthesis gas (syngas) cooler, where high temperature heat can be recovered from the gaseous products, and a low temperature cooler, where lower temperature heat can be recovered from the gaseous products. Alternatively, the cooling process can provide for the quenching of the hot syngas in which case only low temperature heat is recovered from the gaseous products. After being cooled and cleaned, the gaseous products can be converted into or used directly as fuels or serve as building blocks for chemical products such as plastics and chemical fertilizers. Alternatively, or in addition, the gaseous products after cooling and cleaning can be separated and the separated hydrogen variously applied such as for example in powering fuel cells and in refinery operations.

In a particular application, the gasification facility can be incorporated into what is known as an integrated gasification combined cycle, or IGCC, power plant that serves to supply electric power. In an IGCC power plant, following cooling and cleaning, the gaseous products are delivered to a combined cycle power plant where the gaseous products are burned in a gas turbine generator to generate electric power and exhaust heat from the gas turbine is used to create steam that is used to power a steam turbine generator for generating additional electric power.

SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later In accordance with one aspect, the present invention provides a gasification facility that includes a gasifier and a high temperature gas cooler in fluid communication with the gasifier. The high temperature gas cooler is configured to receive and cool one or more gases generated at the gasifier, recover the heat produced by the cooling of the one or more gases and produce superheated steam using the recovered heat. The gasification facility includes a steam utilization device associated with the gasification facility and in fluid communication with the high temperature gas cooler. The gas cooler delivers at least a portion of the superheated steam to the steam utilization device. The steam utilization device is operated by the superheated steam to provide an output utilized within the gasification facility. The gasification facility includes an air separation unit at least partially operated by the output from the output of the stream utilization device.

In accordance with one aspect, the present invention provides a method of operating a gasification facility that includes a gasifier, a high temperature gas cooler and an air separation unit. The method includes generating one or more gases at the gasifier and delivering to the high temperature gas cooler the one or more gases generated at the gasifier. The method includes cooling at the high temperature gas cooler the one or more gases delivered to the high temperature gas cooler from the gasifier and recovering the heat produced by such cooling of the one or more gases. The method includes using the recovered heat produced by the cooling of the one or more gases at the high temperature gas cooler to produce superheated steam. The method includes delivering at least a portion of the superheated steam to a steam utilization device associated with the gasification facility. The method further includes operating the steam utilization device with the superheated steam to provide an output utilized within the gasification facility.

BRIEF DESCRIPTION OF THE DRAWING

The foregoing and other aspects of the present invention will become apparent to those skilled in the art to which the present invention relates upon reading the following description with reference to the accompanying drawings, in which:

FIG. 1 is a schematic flow diagram that illustrates certain example embodiments of the invention.

DESCRIPTION OF EXAMPLE EMBODIMENTS

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

In FIG. 1, a gasification facility or plant is schematically shown to include a gasifier 10 in the nature of a reaction vessel which can be of any of the types that uses a hydrocarbon feedstock. Such gasifiers are well known to those having ordinary skill in the art and are not described in detail here. Also included in the gasification plant is an air separation unit 12 that separates the oxygen in the air from the nitrogen and other gases and delivers the oxygen to the gasifier 10 in such amounts as required for the execution of the gasifying reaction in the gasifier.

The gasification facility further includes a high temperature gas cooler 14 that is in fluid communication with the gasifier. The cooler 14 is configured to receive and cool the one or more gases (commonly referred to as "syngas") that are generated at the gasifier 10 and recover the heat produced by the cooling of the one or more gases. The cooler 14 also is configured to produce superheated steam using the recovered heat. Solid particulate matter is removed from the syngas at the cooler 14 at 22. An example of a high temperature gas cooler that can be used is a so-called radiant synthesis gas, or syngas, cooler which is familiar to those having ordinary skill in the art, although other types of high temperature gas coolers can be employed.

The gasification facility also includes a low temperature gas cooler 16, which is in fluid communication with the high temperature gas cooler 14. The cooler 16 is configured to receive and further cool the one or more gases initially cooled at the high temperature gas cooler and recover at the cooler 16 heat from the one or more gases. Thereafter, the gas is conveyed to a sulfur removal unit 18 that removes sulfur compounds. The gas is then in a condition to be used in a variety of ways such as a fuel for a power plant or as a building block for chemical products, for example, as indicated at 20 in FIG. 1.

It has been known for a high temperature gas cooler to be designed and configured to produce steam that typically has properties not well suited for application to a steam turbine generator for generating electricity. However, in accordance with one aspect of the present invention, the high temperature gas cooler 14, be it a radiant syngas cooler or otherwise, is configured to recover the heat from the one or more gases produced in the gasifier 10 and use that recovered heat to produce superheated steam that is particularly suitable for application to a steam turbine generator. The details of how the cooler 14 can be configured so that it produces superheated steam is not described here since the manner of doing so will be familiar to those having ordinary skill in the art.

Moving on to a description of how the superheated steam, once generated, is used, it is to be noted that the gasification facility shown in FIG. 1 includes a steam turbine 26 that is in fluid communication with the high temperature gas cooler 14 at 24. The steam turbine is configured to generate electric power using at least a portion of the superheated steam that is produced at the cooler 14 using the recovered heat from the one or more high temperature gases cooled at the cooler 14. In this connection, the air separation unit 12 is electrically connected to the steam turbine 26, as schematically indicated at 28, and is configured to operate using the electric power generated at the steam turbine 26. In addition or alternatively, the compressor units, which can be included with the air separation unit 12, are in fluid communication with the high temperature gas cooler 14, as indicated at 30, and are configured so as to receive at least a portion of the superheated steam produced using the recovered heat produced by the cooling of the one or more gases generated at the gasifier 10, whereby the superheated steam drives the compressor units. The manner in which the superheated steam drives the compressors of the air separation unit is well known to those having ordinary skill in the art and is not described here. Thus, either the steam turbine 26, the compressor units of the air separation unit 12, or both the steam turbine and the compressor units is/are example(s) of a steam utilization device associated with the gasification facility and in fluid communication with the high temperature gas cooler.

As shown schematically in FIG. 1 at 32, the high temperature gas cooler 14 can also be in fluid communication with users of superheated steam other than the steam turbine 26 and/or the compressors at the air separation unit 12, including other users at the gasification facility itself and other users that are separate from the gasification facility, whereby at least a portion of the superheated steam produced at the high temperature gas cooler 14 can be delivered to such users. For example, the high pressure steam can be used in a downstream refinery or chemical processing plant or in electric generating plants separate from the gasification plant.

Similarly, as shown schematically at 34 in FIG. 1, the steam turbine 26 can also be electrically connected to a user of electric power other than the air separation unit 12, including other users at the gasification facility itself and other users that are separate from the gasification facility, whereby at least a portion of the electric power generated at the steam turbine 26 can be delivered to such user of electric power separate from the gasification facility as optional export power, whereby at least a portion of the electric power generated at the turbine 26 can be delivered to such user of electric power separate from the gasification facility. A portion of the electric power generated at the turbine 26 also can be transported at 34 to other locations within the gasification plant itself.

Thus output(s) of the steam utilization device(s) (e.g., the steam turbine 26, the compressor units of the air separation unit 12, or both the steam turbine and the compressor units), which are electricity and/or compressive force, is/are utilized within the gasification facility.

Turning once again to the low temperature gas cooler 16, as noted above, the cooler is configured to receive and further cool the one or more gases initially cooled at the high temperature gas cooler 14 and recover heat from the one or more gases. The low temperature gas cooler 16 can be configured to apply the recovered heat from the one or more gases cooled at the low temperature gas cooler 16 to heat at least in part boiler feed water, as indicated at conveying means 50 in FIG. 1, such as tubing, for use at the high temperature gas cooler 14. Such an arrangement can allow for additional steam generation and result in higher system efficiencies.

With reference once more to the steam turbine 26, the steam turbine can be in fluid communication with the low temperature gas cooler 16, whereby steam condensate from the steam turbine can be delivered to the low temperature gas cooler, as indicated schematically at 40 in FIG. 1. The steam condensate then becomes part of the boiler feed water used in the high temperature gas cooler 14 as described in the immediately preceding paragraph.

In a particular example embodiment, the high temperature gas cooler 14 is configured to produce only that amount of superheated steam that is required to generate at the steam turbine 26 only sufficient electric power to satisfy only the total energy demands of the gasification facility. In another particular example embodiment, any heat in excess of that required to satisfy only the total energy demands of the gasification facility can be dealt with in a variety of ways. For example, the heat can be used for the generation of low pressure steam for export to processing operations or the heat can be dissipated through the use of cooling water or fans.

Based on the foregoing descriptions of embodiments of the invention, it will be understood that there is provided a method of operating a gasification facility that includes a gasifier 10, a high temperature gas cooler 14, such as a radiant synthesis gas cooler for example, and an air separation unit 12. The method in one aspect includes generating one or more gases at the gasifier 10, delivering to the high temperature gas cooler the one or more gases generated at the gasifier, cooling at the high temperature gas cooler the one or more gases delivered to the high temperature gas cooler from the gasifier and recovering the heat produced by such cooling of the one or more gases. The method further involves using the recovered heat produced by the cooling of the one or more gases at the high temperature gas cooler 14 to produce superheated steam, delivering to a steam turbine 26 at least a portion of the superheated steam produced by the heat recovered from the cooling of the one or more gases at the high temperature gas cooler, generating electric power at the steam turbine using the superheated steam delivered to the steam turbine and delivering to the air separation unit 12 at least a portion of the electric power generated at the steam turbine.

In another example embodiment, the invention involves a method of operating a gasification facility that includes a gasifier 10, a high temperature gas cooler 14, such as a radiant synthesis gas cooler for example, and an air separation unit 12 wherein the method includes generating one or more gases at the gasifier, delivering to the high temperature gas cooler the one or more gases generated at the gasifier 10, cooling at the high temperature gas cooler 14 the one or more gases delivered to the high temperature gas cooler from the gasifier and recovering the heat produced by such cooling of the one or more gases. The method further includes using the recovered heat produced by the cooling of the one or more gases at the high temperature gas cooler 14 to produce superheated steam, delivering to compressors at the air separation unit 12 at least a portion of the superheated steam and driving the compressors at the air separation unit using the superheated steam delivered to the compressors.

An aspect of the invention also provides example methods wherein at least a portion of the superheated steam produced in the methods described in the preceding two paragraphs is delivered to a user or users of superheated steam separate from the gasification facility. Another aspect of the invention provides example methods wherein at least a portion of the electric power generated at the steam turbine 26 by the superheated steam as described in the methods of the preceding two paragraphs is delivered to a user or users of electric power separate from the gasification facility.

A further aspect of the invention provides an example method wherein the gasification facility includes a low temperature gas cooler 16 and the method includes delivering to the low temperature gas cooler the one or more gases that has been cooled at the high temperature gas cooler 14, cooling at the low temperature gas cooler the one or more gases delivered to the low temperature gas cooler from the high temperature gas cooler and recovering heat from the one or more gases delivered to the low temperature gas cooler from the high temperature gas cooler as the one or more gases is cooled at the low temperature gas cooler. The method further includes applying the recovered heat from the one or more gases that has been cooled at the low temperature gas cooler 16 from the high temperature gas cooler 14 to heat at least in part boiler feed water for use at the high temperature gas cooler and delivering to the high temperature gas cooler the boiler feed water heated at least in part by the recovered heat.

Another aspect of the invention provides an example method wherein steam condensate generated at the steam turbine 26 is delivered to the low temperature gas cooler 16.

Still another aspect of the invention provides an example method wherein all of the superheated steam generated at the high temperature gas cooler 14 is delivered to the steam turbine 26 and the high temperature gas cooler is configured so that it produces only that amount of superheated steam required to generate at the steam turbine 26 only sufficient electric power to satisfy only the total energy demands of the gasification facility.

Yet another aspect of the invention provides an example method wherein all of the superheated steam generated at the high temperature gas cooler 14 is delivered to the steam turbine 26, and the high temperature gas cooler is configured so that it produces only that amount of superheated steam required to generate at the steam turbine only sufficient electric power to satisfy only the total energy demands of the air separation unit 12.

Still another aspect of the invention provides an example method wherein all of the superheated steam generated at the high temperature gas cooler 14 is delivered to the compressors at the air separation unit 12 and the high temperature gas cooler is configured so that it produces only that amount of superheated steam required to satisfy only the energy demands of the compressors at the air separation unit.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A gasification facility including:
    a gasifier;
    a high temperature gas cooler in fluid communication with the gasifier, the high temperature gas cooler being configured to receive and cool one or more gases generated at the gasifier, recover the heat produced by the cooling of the one or more gases and produce superheated steam using the recovered heat;
    two steam utilization devices in fluid communication with the high temperature gas cooler, the gas cooler delivering at least a portion of the superheated steam to the steam utilization devices, the steam utilization devices being operated by the superheated steam to provide respective outputs utilized within the gasification facility, a first of the steam utilization devices includes a steam turbine in fluid communication with the high temperature gas cooler and configured to generate electric power as an output using at least the portion of the superheated steam produced at the high temperature gas cooler, and
    an air separation unit separating oxygen from air and at least partially operated by the electrical power output from the stream turbine, the air separation unit being electrically connected to the steam turbine to receive the electric power from the steam turbine, a second of the steam utilization devices includes at least one compressor of the air separation unit, which is in fluid communication with the high temperature gas cooler and configured so as to receive and be driven by at the least a portion of the superheated steam, the air separation unit being operatively connected to the gasifier for provision of oxygen to the gasifier.

2. The gasification facility of claim 1 wherein the high temperature gas cooler includes a radiant synthesis gas cooler.

3. The gasification facility of claim 1 wherein the high temperature gas cooler is also in fluid communication with a user of superheated steam separate from the gasification facility, whereby at least a portion of the superheated steam produced at the high temperature gas cooler can be delivered to the user of the superheated steam separate from the gasification facility.

4. The gasification facility of claim 1 wherein the steam turbine is also electrically connected to a user of electric power separate from the gasification facility, whereby at least a portion of the electric power generated at the steam turbine can be delivered to the user of electric power separate from the gasification facility.

5. The gasification facility of claim 1 further including:
a low temperature gas cooler in fluid communication with the high temperature gas cooler, the low temperature gas cooler being configured to receive and cool the one or more gases initially cooled at the high temperature gas cooler and recover heat from the one or more gases cooled at the low temperature gas cooler to heat at least in part boiler feed water for use at the high temperature gas cooler; and
conveying means configured to deliver to the high temperature gas cooler from the low temperature gas cooler the boiler feed water heated at least in part by the heat recovered at the low temperature gas cooler.

6. The gasification facility of claim 1 wherein the high temperature gas cooler is configured to produce only that amount of superheated steam required to generate at the steam turbine only sufficient electric power to satisfy only the total energy demands of the gasification facility.

7. The gasification facility of claim 1 wherein the high temperature gas cooler is configured to produce only that amount of superheated steam required to generate at the steam turbine only sufficient electric power to satisfy only the energy demands of the air separator.

8. The gasification facility of claim 1 wherein the high temperature gas cooler includes a radiant synthesis gas cooler.

9. The gasification facility of claim 1 wherein the high temperature gas cooler is also in fluid communication with a user of superheated steam separate from the gasification facility, whereby at least a portion of the superheated steam produced at the high temperature gas cooler can be delivered to the user of the superheated steam separate from the gasification facility.

10. The gasification facility of claim 1 further including:
a low temperature gas cooler in fluid communication with the high temperature gas cooler, the low temperature gas cooler being configured to receive and cool the one or more gases initially cooled at the high temperature gas cooler and recover heat from the one or more gases cooled at the low temperature gas cooler to heat at least in part boiler feed water for use at the high temperature gas cooler; and
conveying means configured to deliver to the high temperature gas cooler from the low temperature gas cooler the boiler feed water heated at least in part by the heat recovered at the low temperature gas cooler.

11. The gasification facility of claim 1 further including:
a low temperature gas cooler in fluid communication with the high temperature gas cooler, the low temperature gas cooler being configured to receive and cool the one or more gases initially cooled at the high temperature gas cooler and recover heat from the one or more gases cooled at the low temperature gas cooler;
wherein the steam turbine is in fluid communication with the low temperature gas cooler, whereby steam condensate from the steam turbine can be delivered to the low temperature gas cooler.

12. The gasification facility of claim 1 wherein the high temperature gas cooler is configured to produce only that amount of superheated steam required to satisfy only the energy demands of the compressors at the air separation unit.

* * * * *